July 20, 1926.
R. E. BROWN
SAFETY DEVICE
Filed June 13, 1923   2 Sheets-Sheet 1
1,593,427
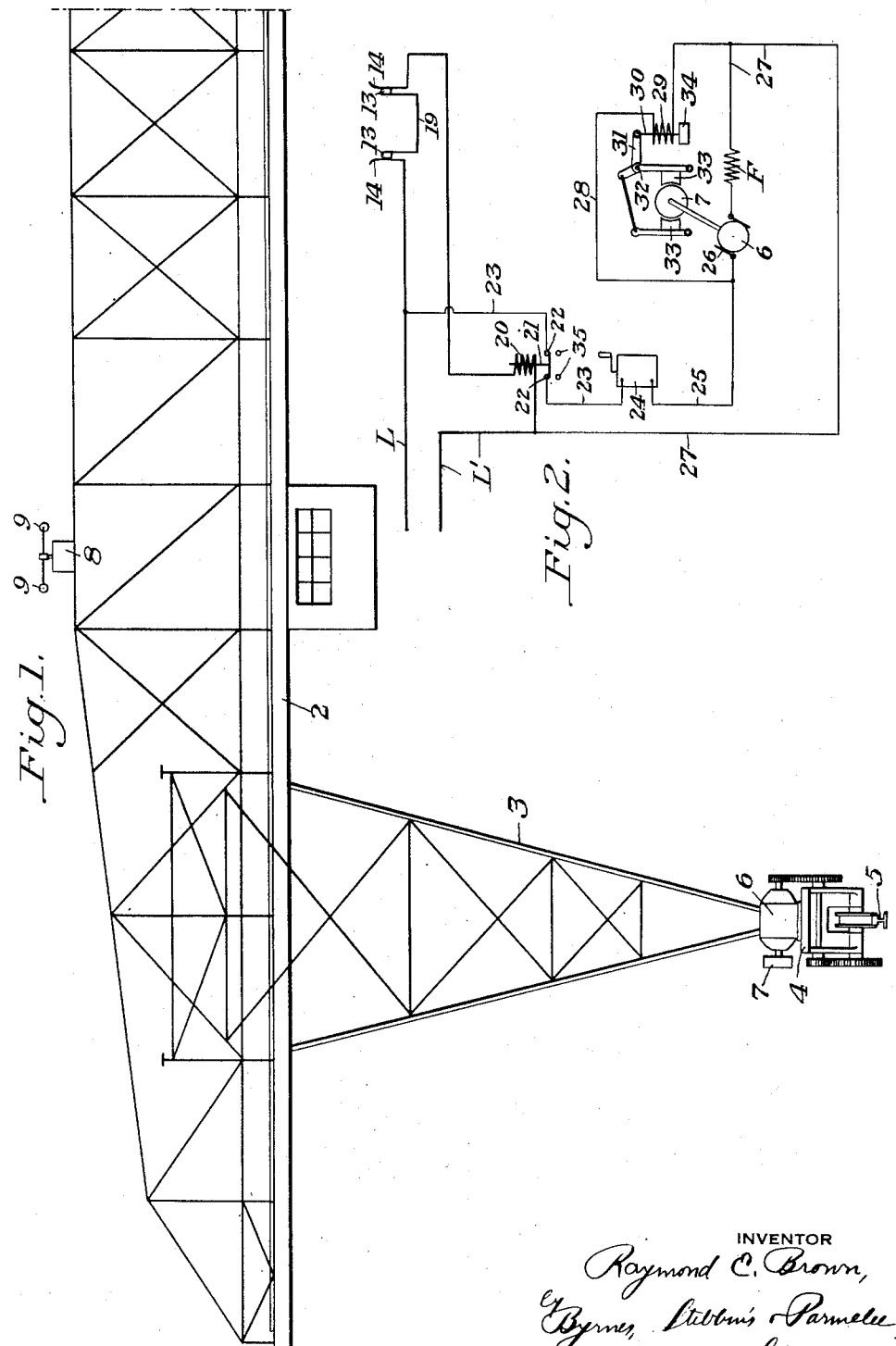
INVENTOR
Raymond C. Brown,
Byrnes, Stebbins & Parmelee
his attys.

July 20, 1926.
R. E. BROWN
SAFETY DEVICE
Filed June 13, 1923
1,593,427
2 Sheets-Sheet 2
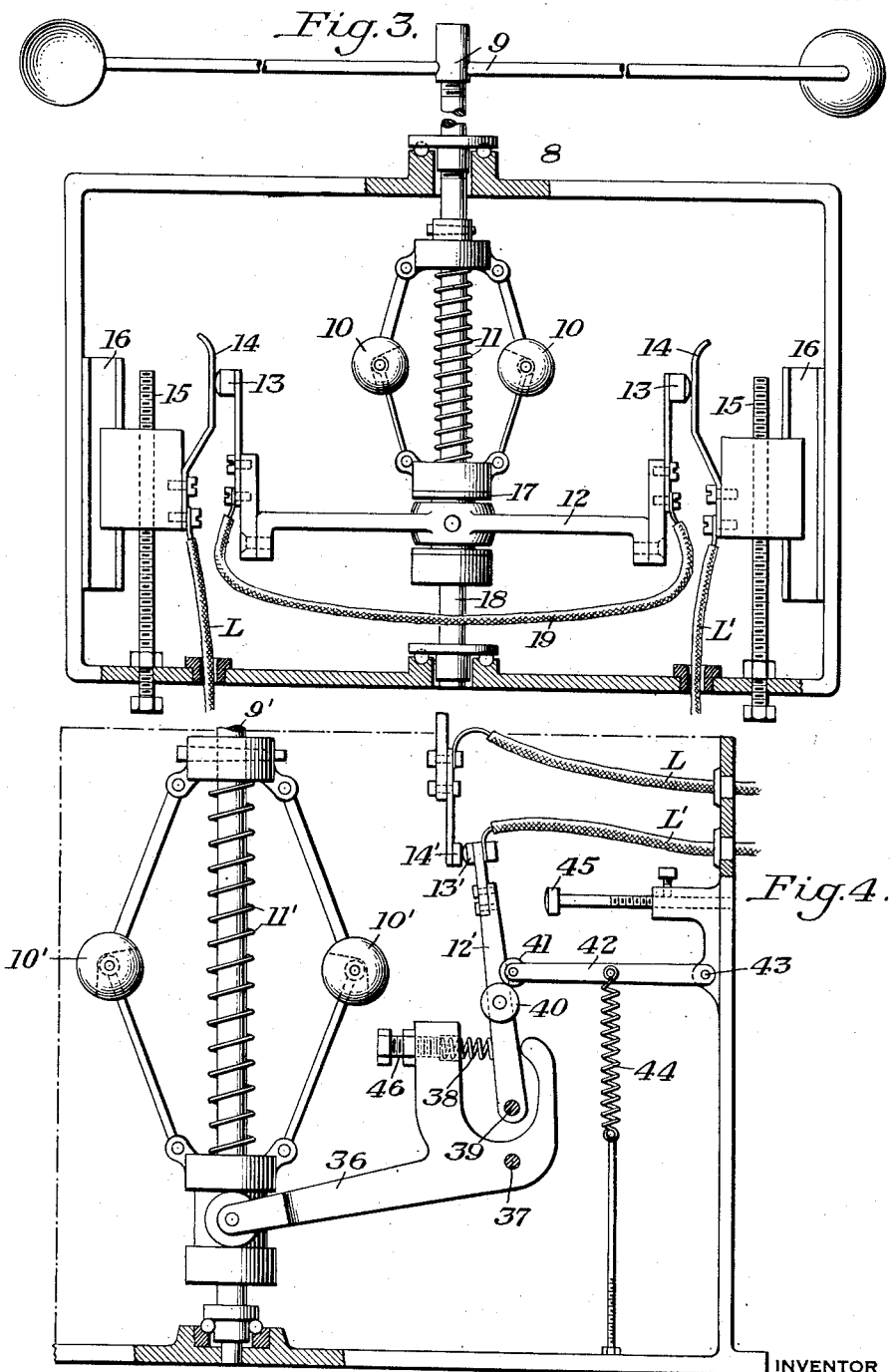

Patented July 20, 1926.

1,593,427

UNITED STATES PATENT OFFICE.

RAYMOND E. BROWN, OF PITTSBURGH, PENNSYLVANIA, ASSIGNOR TO HEYL AND PATTERSON, INCORPORATED, OF PITTSBURGH, PENNSYLVANIA, A CORPORATION OF PENNSYLVANIA.

SAFETY DEVICE.

Application filed June 13, 1923. Serial No. 645,090.

The present invention relates broadly to material and article handling apparatus, and more particularly to apparatus of this type usually referred to in the art as bridge cranes, although it will be apparent that the utility of the invention with respect to its applicability is not limited to any specific type of apparatus.

In accordance with the usual practice, coal docks, coal storage yards, and similar installations are usually necessarily located in more or less exposed locations. For this reason, it will be apparent that the apparatus, in handling the material, and more particularly the bridge cranes, have large areas exposed to the wind. Frequently the wind velocity in such locations is such as to make the operation of the apparatus exceedingly dangerous, and considerable attention is at present being paid to this particular question.

Comparatively few pieces of apparatus as customarily installed have sufficient braking power to stop the movement of the bridge in the event a very high wind strikes it while the bridge is moving, even though the brakes and rail clamps are so designed as to be capable of maintaining the bridge stationary under high wind velocities, provided they are in good condition. While it is a comparatively simple engineering task for the designers of such bridges to calculate with some degree of accuracy the maximum wind velocity in which it is safe to move such bridges, the operatives in charge thereof usually have no accurate or suitable means of ascertaining the wind velocity at a given instant. In some cases it is customary to equip docks and the like with anemometers of a type approved by the Government. Such anemometers, however, are usually of the recording type and the record made thereby is not suitable for giving an accurate indication of the instantaneous velocity of the wind at a given time in such manner as to materially assist the operatives of the material handling apparatus. In the interest of safety, it is customary to overestimate the actual wind velocity, and as a result thereof considerable time is lost from time to time due to the shutdown of certain apparatus when the wind velocity is not actually high enough to justify such action.

It will be apparent that while it is possible to provide each piece of apparatus with an anemometer or other wind responsive device having a suitable indicating scale, and locate the same in the cab with the operative, this imposes another duty on the operative, and in view of the many things with which he must already contend, such installations have met with considerable objection.

In accordance with the present invention there is provided a wind responsive device of the velocity type, such as an approved anemometer, located on each piece of apparatus which it is desired to control, at an exposed point, the pressure device controlling the various operating circuits in such manner as to open the same when the wind velocity exceeds a predetermined maximum to prevent movement of the apparatus during such time.

It has been found highly desirable in connection with apparatus of this character to utilize circuits normally closed through limit switches, for the various operating motors and brakes so that immediately upon opening the circuit, either intentionally or due to injury thereto, it will be impossible to actuate any of the moving parts. To secure the full advantages of the present invention, the wind velocity responsive device is preferably used with a closed circuit of this character in such manner as to open the circuit when the wind velocity reaches such a point that operation of the apparatus is unsafe.

In the accompanying drawings there are illustrated, more or less diagrammatically, certain embodiments of the present invention, it being understood that the drawings are not to be construed in a limiting sense, as changes may obviously be made in the construction shown therein without departing from the spirit of the invention or scope of my broader claims.

In the drawings,—

Figure 1 is a side elevation of one end portion of a material handling apparatus of the bridge crane type;

Figure 2 is a diagrammatic view illustrating one type of controlling circuit;

Figure 3 is a detail view, partly in section and partly in elevation, of one form of limit switch together with its wind velocity responsive device for controlling the same; and Figure 4 is a view similar to Figure 3, illustrating a slightly modified form of limit switch and actuating mechanism.

While it will be apparent that the type of apparatus with which the present invention is used may vary within wide limits, there is shown in Figure 1 a portion of a bridge crane which may, for example, be of the construction indicated generally in prior Patent 1,153,672 of September 14, 1915. In this construction there is provided a suitable traveling bridge 2 having suitable supporting legs 3, only one of which is illustrated. Each of these legs may be carried on suitable trucks 4 adapted to move on tracks 5 under the influence of propelling motors 6 suitably geared to the traction wheels, as is customary in the art. Each of the propelling motors, in the event more than one is provided, may be equipped with a brake 7 of the type adapted to be normally set automatically when the propelling motor circuit is deenergized.

Mounted on the bridge crane at some exposed point so as to be subjected to the full pressure and velocity of the wind, is a pressure or velocity responsive device 8 of the type usually referred to as an anemometer. The rotating element 9 of the anemometer, as clearly shown in Figure 3, extends vertically, and within a suitable protecting casing carries a centrifugal governor comprising weights 10 adapted to be thrown outwardly as the speed of rotation of the element 9 increases. This movement compresses the spring 11 and raises the switch arm 12. The switch arm in turn carries contacts 13 adapted to cooperate with other contacts 14 carried by adjusting mechanism 15 on suitable slides 16 within the casing. By reason of this adjusting mechanism, it will be apparent that the vertical position of the contacts 14 may be varied at will. This position determines the time at which under the influence of centrifugal force the weights 10 will have lifted the contacts 13 to a point at which they will be disengaged from the contacts 14. This point in turn will correspond to a predetermined wind velocity which has been calculated as the safe maximum velocity at which the bridge may be moved. As soon as the wind velocity drops below this point, the speed of rotation of the element 9 will decrease and the spring 11 will tend to draw the weights 10 inwardly against the action of centrifugal force, thereby again bringing the contacts 13 and 14 into conducting relationship.

It will be apparent that the switch arm 12 is preferably held against rotation and is movable only in a vertical direction. For this purpose it may be mounted on a sleeve 17 on the vertical shaft 18.

In Figure 2 there is illustrated diagrammatically one form of circuit containing the limit switch shown in Figure 3. In this circuit current is fed from a line wire L to one of the contacts 14 and thence through the contacts 13 and their connecting cable 19 to the other contact 14. This other contact is in turn connected to one side of a solenoid 20, the opposite side of which is connected to a line wire L'. When the wind velocity is low enough so that the contacts 13 and 14 are in conducting relationship, as indicated in Figures 2 and 3, the circuit through the coil 20 will be complete, thereby raising the controlling switch 21 into engagement with the contacts 22. This will establish a circuit from the line wire L through wire 23, contacts 22, and switch 21, to the controller 24. The outlet conductor 25 from the controller may lead to one of the brushes 26 for the motor 6, while the other brush will be connected through the field F and wire 27 to the line wire L'. Under these conditions it will be apparent that the controller 24 may be operated at will to control the operation of the bridge moving motor 6.

In a shunt circuit 28 passing around the motor 6 and its field, is a second solenoid 29 which when energized is adapted to move upwardly its core 30 and thereby swing the bell crank lever 31 in a counter-clockwise direction about its pivotal mounting 32. This will tend to spread the brake shoes 33, as understood in the art, and thereby release the brake drum 7. As soon, however, as the shunt circuit 28 is deenergized, the weight 34 will draw the bell crank lever 31 downwardly and apply the brake shoes 33 to prevent further operation of the propelling motor 6. This operation will occur each time the controller 24 is moved to its neutral position, and will also occur in the event of injury to the circuit.

In the event the circuit to the solenoid 20 is opened due to the action of the switch arm 12 under excessive wind pressure, the switch 21 will be permitted to drop downwardly into engagement with the stops 35. At this time, the main circuit to the controller will be open, thereby preventing any operation of the motor 6. It will also insure deenergization of the solenoid 29 and the consequent application of the brake. It will be apparent, therefore, that there is provided mechanism automatically operable under high wind pressure for opening an electrical circuit for thereby not only making it impossible to energize the propelling motor or motors, but to also apply an actual braking force thereto.

With the form of apparatus illustrated in Figure 3 it will be apparent that if the limit switch it set in such manner as to open, for example, at a wind pressure corresponding to substantially 60 miles per hour, there will be a critical point existing from substantially 59 to 61 miles through which the movement of the switch arm 12 will be such as to intermittently open and close the controlling circuit. This condition might be objectionable at times, as it would result in uncertain control of the bridge moving motor or motors and the application of the braking force thereto. In Figure 4 there is illustrated a modified form of construction adapted to obviate this objection.

In accordance with the modified form of limit switch, the centrifugal weights 10' are adapted, through the collar connected thereto, to swing the lever 36 about its pivotal mounting 37. In Figure 4 the parts are shown in normal position indicating a wind velocity at which it is safe to operate the material handling apparatus. As the wind velocity increases, the lever 36 will be moved in a clockwise direction about its pivotal mounting, thereby placing the spring 38 under compression and tending to move the switch arm 12' to the right, as viewed in Figure 4, about its pivotal mounting 39. The switch arm 12' carries a roller 40' which is engaged at all times by a second roller 41 on an arm 42 having a pivotal mounting 43 on the enclosing casing. The movement of the arm 42 is restricted by a tension spring 44. When the compression of the spring 38 reaches a predetermined point, the roller 40 will be forced to the right, thereby lifting the roller 41 and causing it to ride thereover into a position in which the switch arm 12' will be held against the stop 45. This will result in more or less of a snap action, and the switch arm will remain in contact with the stop 45 until such time as the wind pressure has passed through the critical period before referred to and dropped below the predetermined maximum at which it is safe to operate the material handling apparatus. At this time, the reverse operation will occur; the switch arm 12' will snap back into the position illustrated in Figure 4, with the contact 13' in engagement with the fixed contact 14'. The adjustment of this form of control for different wind velocities and pressures may be obtained either by changing the tension of the spring 44 or the adjustment of the screw 46 for the compression spring 38, or both, as will be clearly understood.

The advantages of this invention arise from the provision of a wind responsive device directly effective for opening a controlling circuit in the event of unsafe conditions of operation.

Still further advantages arise from the provision of an automatically responsive device adapted, through the opening of a controlling circuit, not only to make it impossible to move the apparatus controlled thereby by breaking the circuit to the propelling motor or motors, but by applying brakes thereto for positively holding the parts in the positions which they may then occupy.

I claim:

1. The combination with a traveling crane structure, or the like, having a propelling means, of a wind motor thereon, a speed responsive device driven by the wind motor, and a control for the propelling means operatively associated with the speed responsive device, substantially as described.

2. The combination with a traveling crane structure, a propelling means, of a revoluble wind motor, a speed responsive switch operatively connected with said revoluble wind motor, and a control for the propelling means in circuit with said switch, substantially as described.

3. In a material handling apparatus, a movable carrying structure, electric propelling means therefor, wind velocity responsive means carried by said structure, and a snap action switch controlled by said wind velocity responsive means for opening the circuit to said propelling means when the wind exceeds a given velocity, substantially as described.

4. In a material handling apparatus, a bridge crane, electric propelling means therefor, an anemometer carried by said bridge crane, and a speed responsive limit switch operatively connected to said anemometer for opening the circuit to said electric propelling means when the wind exceeds a given velocity, substantially as described.

In testimony whereof I have hereunto set my hand.

RAYMOND E. BROWN.